United States Patent [19]

Noda

[11] 4,416,428
[45] Nov. 22, 1983

[54] FISHING REEL

[75] Inventor: Hideo Noda, Sakai, Japan

[73] Assignee: Shimano Industrial Company Limited, Osaka, Japan

[21] Appl. No.: 337,126

[22] Filed: Jan. 5, 1982

[30] Foreign Application Priority Data

Jan. 19, 1981 [JP] Japan .............................. 56-5470[U]
Jan. 19, 1981 [JP] Japan .............................. 56-5471[U]

[51] Int. Cl.³ ............................................ A01K 89/01
[52] U.S. Cl. ............................................ 242/84.21 R
[58] Field of Search .................... 242/84.1 R, 84.2 R, 242/84.2 A, 84.2 B, 84.21 R, 84.21 A, 84.5 R, 84.51 R, 84.51 A

[56] References Cited

U.S. PATENT DOCUMENTS 3,351,301 11/1967 Bretton .................... 242/84.21 R
3,967,791 7/1976 Morishita .................. 242/84.21 R
4,173,317 11/1979 Hamayasu et al. ......... 242/84.21 R
4,196,868 4/1980 Puryear et al. ............ 242/84.21 R X Primary Examiner—John Petrakes
Attorney, Agent, or Firm—Stevens, Davis, Miller & Mosher

[57] ABSTRACT

A fishing reel, which supports a spool shaft having a spool which is movable in reciprocation longitudinal of a reel body, comprises a master gear having a first annular toothed portion for transmitting rotation to a rotary frame and a second annular toothed portion disposed at a position different in diameter from the first toothed portion, and an association shaft which has an association gear engageable with the second toothed portion and carries an engaging member engageable with a traverse groove provided at the spool shaft, so that the engaging member rotates following the rotation of the association shaft to allow the spool shaft to reciprocate longitudinally of the reel body, thereby avoiding longitudinal movement of the spool shaft in synchronism with rotation of the rotary frame.

6 Claims, 8 Drawing Figures

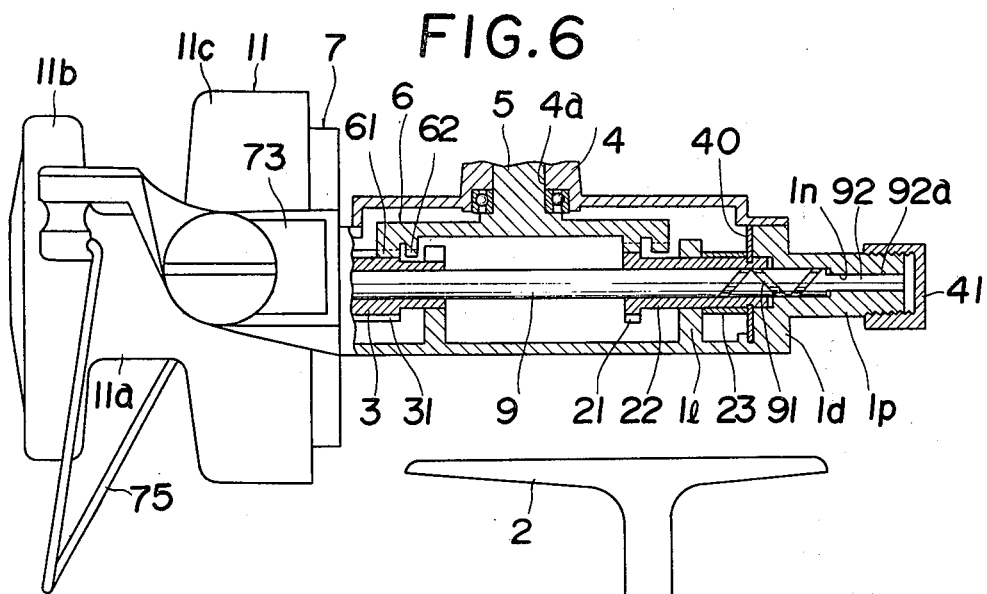

FISHING REEL

FIELD OF THE INVENTION

This invention relates to a fishing reel, and more particularly to a fishing reel comprising a spool shaft which has a spool and is supported to a reel body in relation of being reciprocable longitudinally of the reel body and a rotary frame which has a bail arm and is supported rotatably to the reel body, so that the rotary frame rotates while the spool shaft is moving longitudinally of the reel body to wind a fishing line on the spool.

BACKGROUND OF THE INVENTION

Conventionally, the fishing reel which winds a fishing line on the spool by the rotation of the rotary frame and is the reciprocal movement of the spool shaft as foregoing, is called a spinning reel and well-known.

A spinning reel is box-shaped and has a front wall and side walls, the front wall providing a through bore through which a tubular driven shaft and the spool shaft are inserted, so that the rotary frame is supported to one axial end of the driven shaft and the spool to one axial end of the spool shaft. A drive shaft having a handle bar is supported to the side wall at a right angle with the driven shaft and spool shaft, and a transmission mechanism for transmitting rotation of the handle from the drive shaft to the rotary frame through the driven shaft is housed within the reel body.

The transmission mechanism comprises a master gear supported to the drive shaft and a pinion provided at the driven shaft, so that rotation of the handle bar is transmitted to the rotary frame at increased speed through engagement of the pinion with the master gear.

A reciprocation mechanism is provided which comprises a traverse groove provided at the outer periphery of a part of the spool shaft within the reel body and an engaging member engageable with the traverse groove and supported to a part of the driven shaft within the reel body, the engaging member engaging with the traverse groove to allow the spool shaft to reciprocate longitudinally of the reel body following the rotation of the driven shaft.

The reciprocation mechanism performs a smooth reciprocation of the spool, but puts the rotation of the rotary frame in synchronism with the longitudinal movement of spool, so that the fishing line guided by the rotary frame is wound on the spool at a position fixed relative to the rotary frame. As a result, the line cannot be wound uniformly axially throughout a trunk of the spool, thereby creating a problem in that the would line becomes lumped in a wave as the amount of the wound line increases.

Therefore, the line, during casting, is subjected to an excessive resistance against being drawn out, or the lumped line gets tangled, thereby lessening the casting distance.

The development department of the assignee of the inventor, has developed a fishing reel which has a master gear comprising a toothed portion and an annular toothed portion smaller in diameter than the toothed portion of master gear, formed radially inwardly thereof, and engageable with a pinion; an association shaft which has an association gear engageable with the smaller diameter toothed portion of the master gear and supported rotatably to the driven gear; and an engaging member engageable with a traverse groove at the spool shaft and housed in an inner space of the rotary frame, so that the rotary frame does not rotate in synchronism with the longitudinal movement of the spool.

This reel, however, has the engaging portion disposed in an inner space of the rotary frame, whereby it should be mounted on a projection of the association shaft projecting outwardly from the axial end of the driven shaft. Also, the association shaft and driven shaft should be concentric and free in relative rotation to each other. Hence, the reel as a whole is complex in construction and troublesome to assemble and machine.

SUMMARY OF THE INVENTION

An object of the invention is to provide a fishing reel which can avoid synchronism of the longitudinal movement of spool with the rotation of rotary frame in a reel having a reciprocation mechanism comprising a traverse groove and an engaging member engageable therewith so as to wind a fishing line on the spool uniformly axially throughout a trunk thereof, and which is simple in construction and easy to assemble.

In detail, the reel of the invention is provided with; a transmission mechanism comprising a drive shaft having a master gear and a driven shaft having a pinion engageable with the master gear; and a reciprocation mechanism comprising a traverse groove provided at the outer periphery of a spool shaft and an engaging member engageable with the traverse groove. The master gear has a first annular toothed portion engageable with the pinion and a second toothed portion shifted radially from the first tooth portion. An association shaft having an association gear engageable with the second tooth portion is supported within a reel body only rotatable with respect to the spool shaft and carries the engaging member, so that the association shaft has a different rotational speed from the driven shaft to thereby avoid synchronism of the reciprocal movement of the spool with the rotation of the rotary frame. Hence, the fishing line is wound on the spool uniformly axially throughout a trunk thereof irrelevantly to the rotation of the rotary frame. Furthermore, since the association shaft is disposed within the reel body, the engaging member can be provided in the vicinity of the engaging portion of the association gear with the second toothed portion. As a result, the association shaft is smaller in length and disposed at a desired position with respect to the master gear, thereby providing an increased degree of design freedom and an effective utilization of a dead space in the reel body.

These and other objects of the invention will become more apparent in the detailed description and examples which follow.

BRIEF DESCRIPTION OF THE DRAWINGS

FIG. 6 is a partially cutaway plan view of the FIG. 5 embodiment, FIG. 7 is a longitudinally sectional side view of a further modified embodiment of the invention, corresponding to FIG. 1, and FIG. 8 is a view explanatory of a part of the FIG. 7 embodiment.

DETAILED DESCRIPTION OF THE INVENTION

Figure 1:
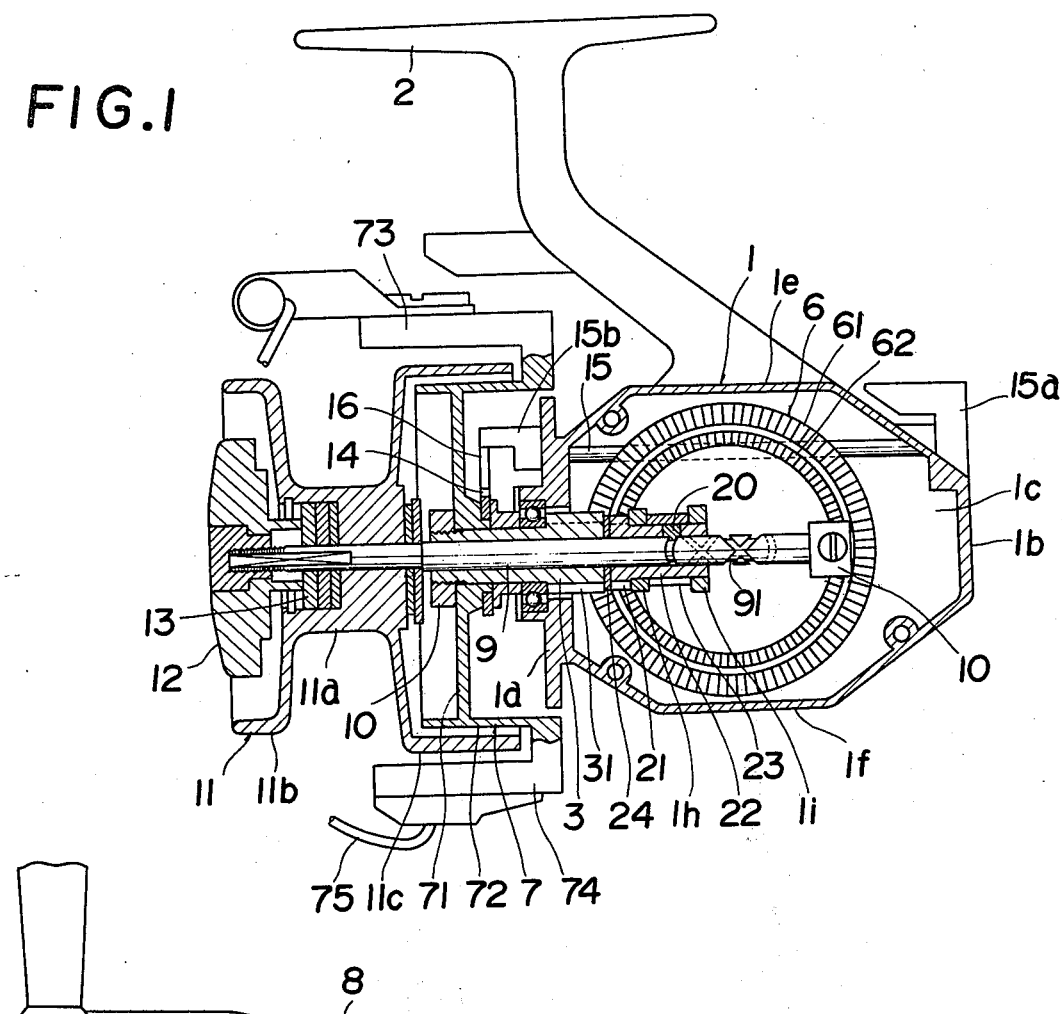
FIG. 1 is a longitudinally sectional side view of an embodiment of a fishing reel of the invention.
Figure 2:
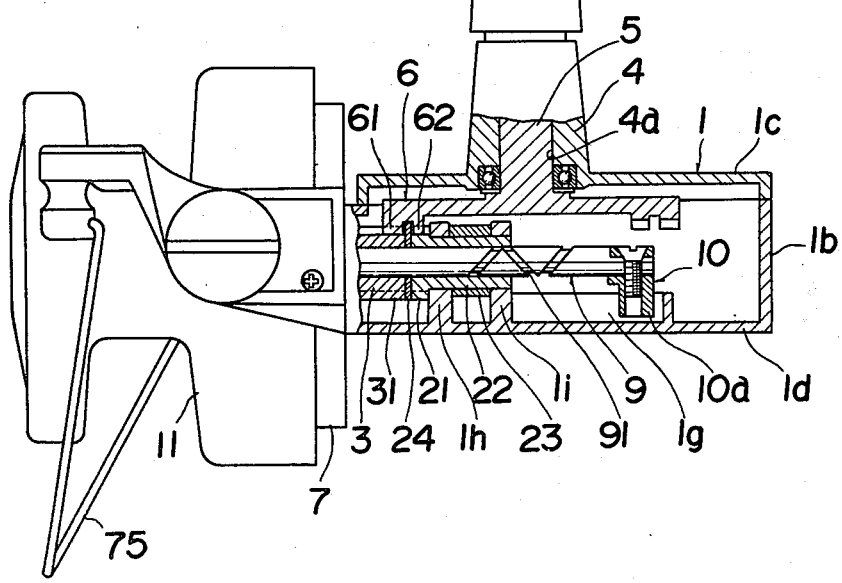
FIG. 2 is a partially cutaway plan view of the FIG. 1 embodiment.

A typical fishing reel of the invention is shown in FIGS. 1 and 2, in which a reel body 1 is box-shaped and has a front wall 1a, a rear wall 1b, a pair of side walls 1c and 1d, an upper wall 1e, and a lower wall 1f. A mounting leg 2 for a fishing rod (not shown) is mounted on the upper wall 1e, a through bore is provided at the front wall 1a, a tubular driven shaft 3 is supported rotatably into the through bore, a bearing cylinder 4 having a shaft bore 4a facing perpendicularly to the axis of driven shaft 3 is provided at one side wall 1c, and a drive shaft 5 having a master gear 6 is journalled to the bearing cylinder 4.

The driven shaft 3 enters at its one axial end into the reel body 1 and projects at the other axial end outwardly from the front wall 1a, the one axial end carrying a pinion 31 engageable with a first annular toothed portion 61 provided at one side of the outer peripheral portion of master gear 6, the other axial end fixedly carrying a rotary frame 7.

The drive shaft 5 rotates in association with a handle bar 8, and a transmission mechanism comprises the drive shaft 5 including the master gear 6 and the driven shaft 3 including the pinion 3, and transmits the rotation of handle 8 to the rotary frame 7.

A spool shaft 9 is insertably supported through the driven shaft 3 in relation of being reciprocable longitudinally of reel body 1, is larger in length than the driven shaft 3, and has a slider 10 at one axial end entering into the reel body 1 and a spool 11 at the other axial end projecting from the front wall 1a.

The slider 10 moves together with the spool shaft 9, and, as shown in FIG. 2, has at one side a projection 10a which enters into a guide groove 1g provided at the side wall 1d at the reel body 1, thereby restraining the spool shaft 9 from rotating but allowing it only to axially move.

The rotary frame 7, as shown in FIG. 1, is provided with a support plate 71 having a central boss, a cylindrical member 72 in continuation of the outer periphery of support plate 71, and a pair of support arms 73 and 74 which swingably carry a bail arm 75, the boss of support plate 71 being fitted onto one axial end of driven shaft 3 and tightened by a lock nut 76, thereby fixing the rotary frame 7 to the driven shaft 3.

The spool 11 fixed to the spool shaft 9 comprises a cylindrical trunk 11a and a pair of flanges 11b and 11c. The trunk 11a is fitted onto one axial end portion of spool shaft 9 and a drag knob 12 is screwed therewith to support the spool 11 to the spool shaft 9 under a given rotational resistance through a friction plate 13.

In addition, in FIGS. 1 and 2, reference numeral 14 designates an anti-reverse-rotation gear supported to an axial end of driven shaft 3 projecting frontward from the front wall 1a, and 15 designates an operating lever supported rotatably between the front and rear walls 1a and 1b, the lever 15 having at one end thereof a knob 15a and at the other end a cam 15b. Between the cam 15 and the anti-reverse-rotation gear 14 is provided an anti-reverse-rotation pawl 16 which engages with the anti-reverse-rotation gear 14 to restrain the rotary frame 7 from reverse rotation and disengages from the gear 14 to allow the rotary frame 7 to rotate reversely.

The fishing reel of the invention includes a reciprocation mechanism which allows the spool shaft 9 to move in reciprocation longitudinal of the reel body 1.

The reciprocation mechanism comprises a traverse groove 91 formed at the outer periphery of spool shaft 9 and an engaging member 20 engageable with the traverse groove 91. A second annular toothed portion 62 is provided at one side of master gear 6 and radially inwardly of the first toothed portion 61 and is smaller in diameter than the first toothed portion 61. A pair of supports 1h and 1i having through bores into which the spool shaft 9 is freely inserted, are provided within a front portion of reel body 1 and at the inside of side wall 1d thereof. An association shaft 22 having an association gear 21 engageable with the second toothed portion 62 is inserted rotatably into the through bores at the supports 1h and 1i, and carries an engaging member 20 in the vicinity of the pinion 31.

The second toothed portion 62 shown in FIGS. 1 and 2 is positioned radially inwardly of the first toothed portion 61 at the master gear 6 and equal in the number of teeth to and smaller in pitch than the first toothed portion 61. The association gear 21 is larger in the number of teeth than the pinion 31, so that the association shaft 22 rotates at lower speed than the driven shaft 3 to prevent synchronism of the rotation of rotary frame 7 with the longitudinal movement of spool 11. In addition, the second toothed portion 62, which is integral with the master gear 6, alternatively may be separate therefrom. Or, it may be positioned radially outwardly of the first toothed portion 61 and larger in diameter than the same.

Alternatively, the association shaft 22 may be supported rotatably to the spool shaft 9 and, for example, a stopper extending from the reel body 1 to the association shaft 22, may be provided to restrain the association shaft 22 from axial movement but allow it only to rotate.

The engaging member 20 comprises a stem having at one end an engaging portion engageable with the traverse groove 91 and is inserted into a through bore at the association shaft 22 and secured thereto by use of a resilient and C-like shaped snap ring 23 fitted thereto.

In addition, a spacer 24 is interposed between the axially end faces of driven shaft 3 and association shaft 22.

In the fishing reel of the invention constructed as described above, the handle bar 8 is turned to rotate the rotary frame 7 via the drive shaft 5, first toothed portion 61 at master gear 6, pinion 31, and driven shaft 3, so that the fishing line is guided by the bail arm 75 and wound on the trunk 11a of spool 11, and also the engaging member 20 revolves via the second toothed portion 62, association gear 21 and association shaft 22, so that the spool shaft 9 together with the spool 11 moves longitudinally of the reel body 1 through the traverse groove 91 engaging with the engaging member 20. Since the association shaft 22 and in turn the engaging member 20 rotates slower than the driven shaft 3 and in turn the rotary frame 7, the line can be wound uniformly on the trunk 11a of spool 11 while changing its wound position thereon by a smaller pitch.

Alternatively, the association shaft 22 and engaging member 20 may be provided within the rear portion of reel body 1 as shown in FIGS. 3, 4, 5 and 6.

Figure 3:
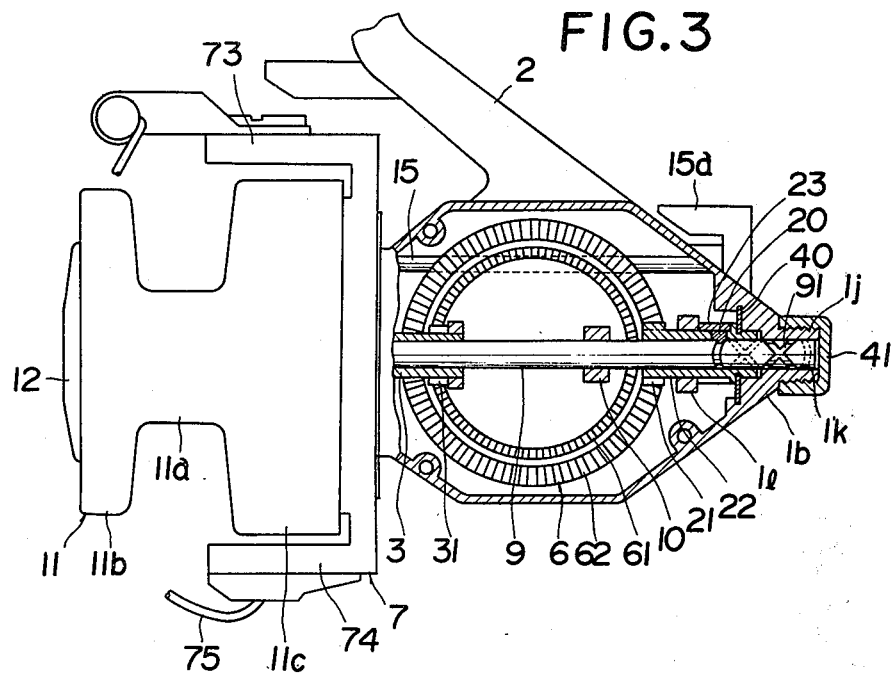
FIG. 3 is a partially cutaway side view of a modified embodiment of the invention.
Figure 4:
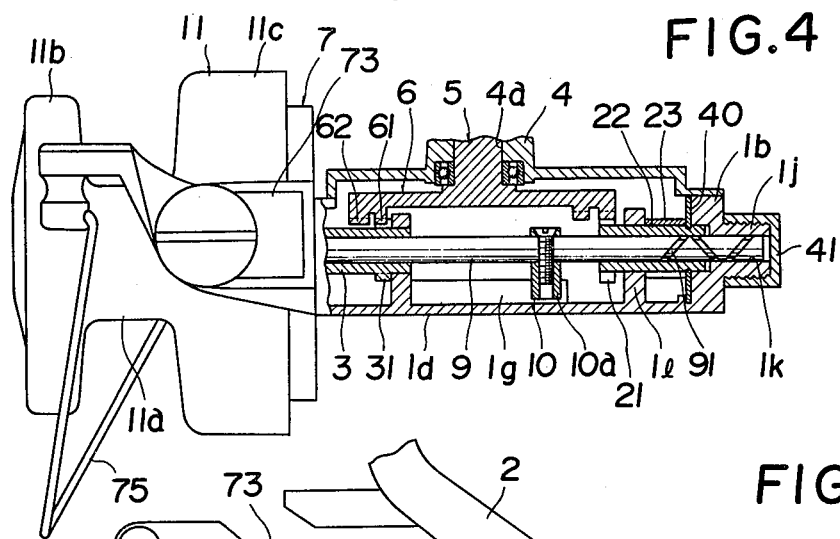
FIG. 4 is a partially cutaway plan view of the modified embodiment in FIG. 3.

Referring to FIGS. 3 and 4, the second toothed portion 62 at the master gear 6 is provided radially outwardly of the first toothed portion 61 and the association shaft 22 is disposed within the reel body 1 at the rear wall 1b side. Namely, a boss 1j is provided at the rear wall 1b and a stepped bore 1k is formed at the boss 1j, so that the spool shaft 9 and association shaft 22 are insertably supported at one axial ends thereof into the bore 1k.

In addition, reference numeral 1l designates a support which is provided at the inner surface of side wall 1d and at the rear wall 1b side. The support 1l and stepped bore 1k rotatably support the association shaft 22.

Figure 5:
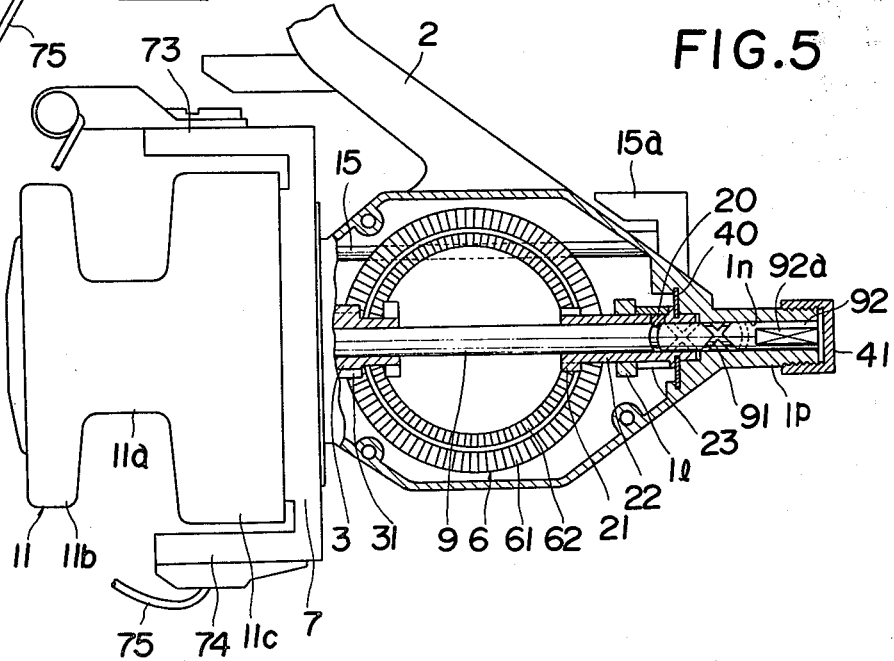
FIG. 5 is a partially cutaway side view of another modified embodiment of the invention.

Referring to FIGS. 5 and 6, the master gear 6 has the second toothed portion 62 formed radially inwardly of the first toothed portion 61, and the association shaft 22 is disposed within the reel body 1 at the rear wall 1b side and supported in the same manner as in FIGS. 3 and 4.

The construction in FIGS. 5 and 6 differs from that in FIGS. 3 and 4 in that the spool shaft 9 extends at one axial end and provides flat faces 92a at the outer periphery of the extension 92, and at the rear wall 1b is formed an axially elongate boss 1p having a not-round bore 1n which receives therein the extension 92 and engages with the flat faces 92a, so that the slider 10 is omitted. In addition, in FIGS. 3 through 6, a washer 40 is used to restrain the axial movement of association shaft 22, and caps 41 screw with the bosses 1j and 1p respectively.

Alternatively, the anti-reverse-rotation gear 14 may be disposed within the reel body 1 and mounted on the driven shaft 3 at the pinion 31 side as shown in FIGS. 7 and 8.

In this instance, an anti-reverse-rotation gear 140 has a boss having a through bore and is fitted therethrough onto the driven shaft 3 at the pinion 31 side, so that a lock nut 100 is tightened to fix the gear 140 together with the rotary frame 7 to the driven shaft 3. An anti-reverse-rotation pawl 160 engageable with the gear 140 and an operating member 150 for the pawl 160, are pivoted to the side wall 1c and a spring 161 biases the pawl 160 to engage with the gear 140, thereby preventing the reverse rotation of rotary frame 7 through the engagement of pawl 160 with gear 140. The anti-reverse-rotation pawl 160 extends outwardly from its pivot portion at the reel body 1 to form an extension 160a. A cam 151 engageable with the extension 160a is provided at an operating member 150 and a torsion spring 152 is interposed between the cam 151 and the side wall 1c, so that the operating member 150 is operated to bias the extension 160a and disengage the pawl 160 from the anti-reverse-rotation gear 140 and the torsion spring 152 keeps the disengagement to allow the rotary frame 7 to reversely rotate.

Incidentally, a spool 110 at the fishing reel shown in FIG. 7 has a trunk 110a larger in axial length and smaller in diameter and has flanges 110b and 110c each smaller in radial length, so that the line, when cast, contacts with both flanges 110b and 110c to a lesser extent, thereby permitting casting to a greater distance. It is noted that, in FIGS. 7 and 8, the same components as in FIG. 1 are designated by the same reference numerals.

Althrough several embodiments have been described, they are merely exemplary of the invention and not to be constructed as limiting, the invention being defined solely by the appended claims.

What is claimed is:

1. A fishing reel comprising a reel body having a front wall and side walls, a rotary frame disposed in front of said front wall at said reel body, supported rotatably to said reel body, and having a tubular driven shaft, a spool disposed in front of the front wall at said reel body and having a spool shaft having at the outer periphery thereof a traverse groove, a handle supported to the side wall at said reel body, a transmission mechanism for transmitting rotation of said handle to said rotary frame, and a reciprocation mechanism for reciprocating said spool shaft longitudinally of said reel body, said transmission mechanism comprising a drive shaft having a master gear rotatable together with said handle and said driven shaft having a pinion engageable with said master gear, said master gear having at one side thereof a first annular toothed portion engageable with said pinion and a second annular toothed portion different in diameter than said first toothed portion, said reciprocation mechanism comprising said traverse groove provided at the outer periphery of said spool shaft, an association shaft having an association gear engageable with said second toothed portion at said master gear and being supported to said reel body only rotatably with respect to said spool shaft, and an engaging member supported to said association shaft and engageable with said traverse groove, so that said association shaft differs from said driven shaft in rotational speed, whereby the reciprocation of said spool caused by the rotation of said engaging member rotating together with said association shaft is not synchronized with respect to the rotation of said rotary frame.

2. A fishing reel according to claim 1, wherein said first toothed portion provided at said master gear is disposed at one side of said master gear and at the radial outside thereof, said second toothed portion being provided radially inwardly from said first toothed portion.

3. A fishing reel according to claim 1, wherein said second toothed portion is provided at one side of said master gear and at the radial outside thereof, said first toothed portion being provided radially inwardly from said second toothed portion.

4. A fishing reel according to claim 1, wherein said association shaft is disposed at the front side of said reel body and near said pinion at said driven shaft.

5. A fishing reel according to claim 1, wherein said association shaft is disposed at the rear side of said reel body and symmetrically with said pinion at said driven shaft across the axis of rotation of said master gear.

6. A fishing reel according to claim 1, wherein an anti-reverse-rotation gear is provided on said driven shaft at a side of its entering into said reel body, said reel body housing therein an anti-reverse-rotation pawl engageable with said anti-reverse-rotation gear to stop the reverse rotation of said driven shaft, and supporting said pawl at the side wall of said reel body.

* * * * *